July 10, 1956  M. E. FRY  2,754,405
DOMESTIC APPLIANCE
Filed July 20, 1953
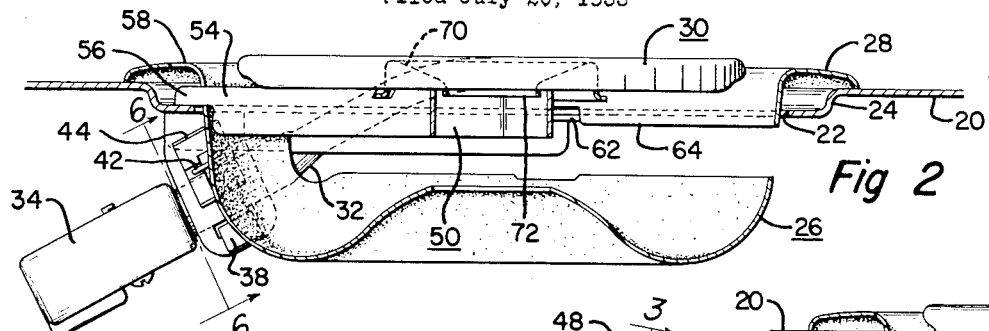
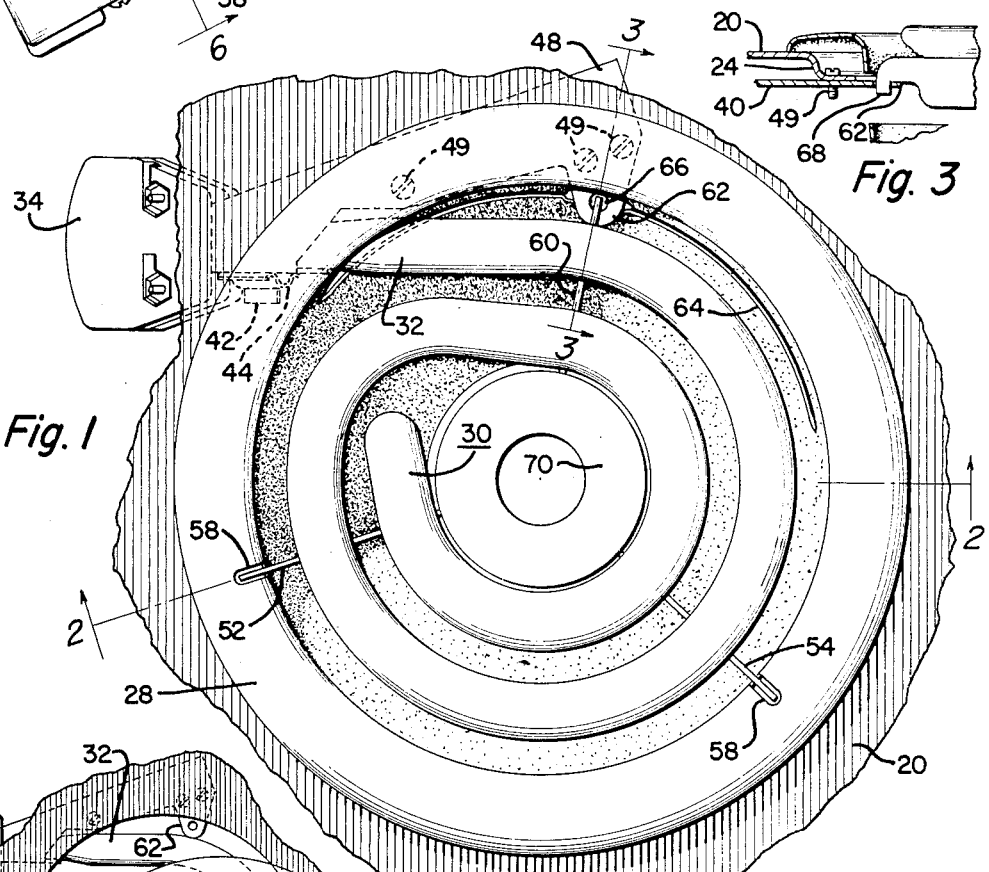
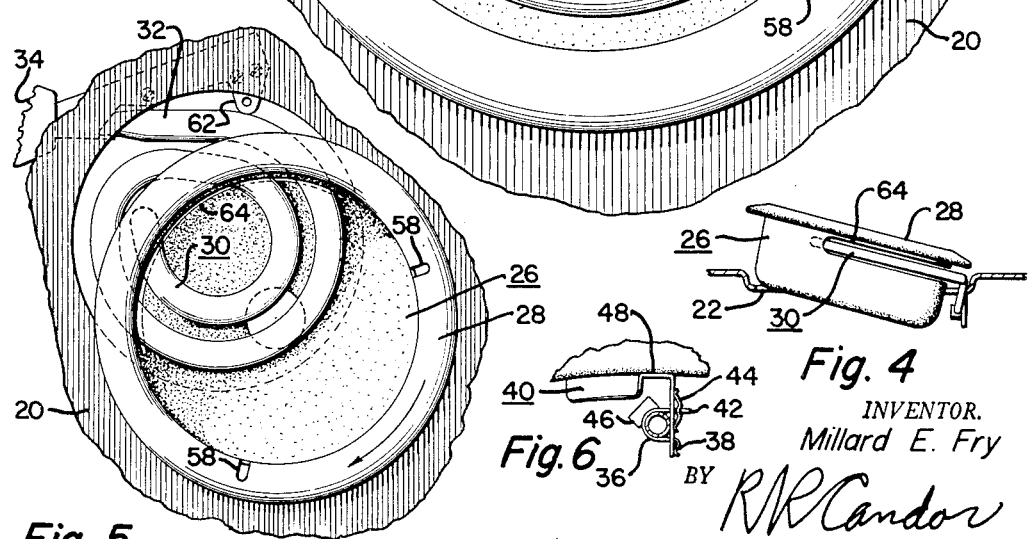
INVENTOR.
Millard E. Fry
BY R. W. Candor
His Attorney

United States Patent Office 2,754,405
Patented July 10, 1956

2,754,405

DOMESTIC APPLIANCE

Millard E. Fry, Dayton, Ohio, assignor to General Motors Corporation, Detroit, Mich., a corporation of Delaware Application July 20, 1953, Serial No. 368,895

11 Claims. (Cl. 219—37)

This application is a continuation-in-part of my copending application S. N. 344,867, filed March 26, 1953.

This invention relates to a domestic appliance and more particularly to a surface heating arrangement for the range top of a domestic range.

In present surface heating arrangements it is customary to provide an ornamental flanged trim ring fitting into the aperture of the range top. Such a trim ring is used to support the heating unit as well as the drip pan. This construction is somewhat costly and the trim ring ordinarily cannot be readily removed from the range for cleaning.

It is an object of my invention to eliminate the trim ring and to individually support the drip pan as well as the heating unit from the range top which may be provided with a conventional aperture.

These and other objects are attained in the form shown by providing a drip pan having an integral continuous rim large enough in diameter to rest upon the edges of the surface heating unit aperture in the top of a range. The heating unit is located within the drip pan and has a terminal portion extending through an elongated horizontal aperture in the upwardly extending wall of the drip pan to a hinge connection with the range top. The heating unit preferably has a separate three-armed support. The drip pan has two additional apertures through which two of the arms of the support extend into supporting relation with the portions of the range top beneath the rim of the drip pan. The hinge connection is provided with a projection extending through the elongated horizontal aperture into supporting relationship with the third arm of the support.

Further objects and advantages of the present invention will be apparent from the following description, reference being had to the accompanying drawings wherein a preferred form of the invention is clearly shown.

In the drawing:

Figure 1 is a top view of a surface heating arrangement embodying one form of my invention;

Figure 2 is a sectional view taken along the lines 2—2 of Figure 1;

Figure 3 is a fragmentary sectional view taken along the line 3—3 of Figure 1;

Figure 4 is a view in elevation showing the start of the operation of removing the drip pan from the aperture in the range top;

Figure 5 is a view showing the withdrawal of the drip pan from the surface heating unit; and Figure 6 is a fragmentary sectional view taken along the line 6—6 of Figure 2 showing the hinge connection.

Referring now to the drawing and more particularly to Figure 2, there is shown a portion 20 of a range top having a step type flanged surface heating unit aperture 22 bordered by a shallow offset step type flange 24. This aperture 22 may be a standard aperture such as has been used for conventional surface heating unit arrangements for a number of years. For this reason my improved surface heating unit arrangement is interchangeable with present arrangements now in production and it is possible that they may be used alternately in the making of similar ranges.

According to my invention, I provide a bowl-shaped drip pan 26 having a wide flanged rim 28 which takes the place of the usual trim ring. This wide flanged rim 28 has a sufficiently large outer diameter that it spans the flange 24 of the aperture 22 and rests directly on the flat top surface of the range top 20 as is clearly shown in Figure 2. Within the drip pan 26 protruding above its upper edge is an electric surface heating unit 30 in the form of a flat spiral. From the outermost portion of this surface heating unit 30 there extends downwardly at an angle of about 35° a terminal portion 32 which terminates in an insulated connector 34 containing the electrical terminals for the surface heating unit 30.

The portion 32 of the heater 30 has a cylindrical portion adjacent the connector 34. A generally U-shaped member 36 (see Figure 6) extends around this cylindrical portion and has one end 38 extending through an aperture in the hinge bracket 40 and turned outwardly. The other end 42 of the member 36 extends through a second aperture in the hinge bracket 40 and is held in place by a U-shaped spring 44 of thin metal. This spring 44 extends through slots provided in the end portion 42. The spring 44 bows outwardly away from the adjacent portion of the hinge bracket 40 so as to pull the U-shaped member 36 toward the hinge bracket 40 so that the bearing portion of the surface heating unit 30 is firmly held. The two aforementioned apertures in the hinge bracket 40 are sufficiently large to permit movement of the heater 30 in the plane of the vertical portion of the bracket 40. The U-shaped bracket 36 preferably has a circumferentially extending slot into which projects a lug 46 welded to the bearing portion of the surface heating unit 30 in such a position as to extend through the slot in the U-shaped member 36. This lug 46 prevents the bearing portion from moving axially in the U-shaped member 36 but permits a rotation of at least 90°.

The hinge bracket 40 has a horizontal portion 48 which is fastened by the screws 49 to the flange portion 24 of the range top 20. The porcelain is wiped from around the screw holes and the screw heads provided with lock washers to cut into the metal of the range top to provide a ground connection for the unit 30.

The surface heating unit 30 is supported by a rigid three-armed support 50 provided with arms 52 and 54 each provided with a projecting shoulder 56 extending through slots 58 in the inner portion of the rim 28 of the drip pan 26. These projecting shoulders 56 rest directly on the flange 24 of the aperture 22 of the range top 20.

To provide a support for the third arm 60, the horizontal portion 48 of the hinge bracket 40 has a projection 62 extending through an elongated horizontal aperture 64 in the upwardly extending side wall of the drip pan 26. Within the rim 28 this projection 62 is provided with an aperture 66. The third arm 60 has a downwardly extending projection 68 which extends through this aperture 66 and limits the lateral movement of the three-armed support 50. The three-armed support 50 has a raised central ring or cylinder 70 fastened to its three arms 52, 54 and 60 adjacent their intersection. It is surrounded by the smallest portion of the spiral member which forms the surface heating unit 30. This raised ring 70 therefore centers the three-armed support 50 relative to the innermost turn of the surface heating unit 30. Thus this raised ring insures the centering of the three-armed support 50 relative to the heating unit 30.

The surface heating unit 30 pivots readily on its bearing because of the hinge arrangement as shown in Figures 4 and 6. In so pivoting, the one edge of the drip pan 26 may also be raised so that it can be readily withdrawn from the surface heating unit aperture 22 as shown in Figure 5. To make this possible, the horizontal elongated aperture 64 directly beneath and parallel to the rim 28 is made sufficiently long that the heating unit 30 may pass through it. With this arrangement is it easy to withdraw both the drip pan and the three-armed support for cleaning while the surface heating unit 30 may be readily tilted so that it can be cleaned on both sides without removal from the range.

While the form of embodiment of the invention as herein disclosed constitutes a preferred form, it is to be understood that other forms might be adopted as may come within the scope of the claims which follow.

What is claimed is as follows:

1. A surface heating arrangement for the surface unit aperture in the range top of a range including a removable drip pan having a rim large enough in diameter to rest upon the edges of said surface unit aperture in a range top, a surface heating unit located within said drip pan, said surface heating unit having three supporting arms, said drip pan adjacent said rim being provided with two apertures for receiving two of said supporting arms, said drip pan having a third aperture, a supporting bracket fastened to the range top having an extension extending through said third aperture into direct contact supporting relationship with the third supporting arm of said surface unit, said two supporting arms having projections sufficiently long to extend through said two apertures and to rest upon edge portions of said surface unit aperture.

2. A surface heating arrangement for the surface unit aperture in the range top of a range including a removable drip pan having a rim large enough in diameter to rest upon the edges of said surface unit aperture in a range top, a surface heating unit located within said drip pan, said surface heating unit having three supporting arms, said drip pan adjacent said rim being provided with two apertures for receiving two of said supporting arms, said drip pan having a third aperture, a supporting bracket fastened to the range top having an extension extending through said third aperture into supporting relationship with the third supporting arm of said surface unit, said two supporting arms having projections adapted to rest upon edge portions of said surface unit aperture, the extension of said supporting bracket being provided with an aperture therein, said third supporting arm having a projection extending into said aperture for locating said arm laterally.

3. A surface heating arrangement for a flanged surface unit aperture in the range top of a range including a removable drip pan having a rim large enough in diameter to rest upon the range top outside of the flange of said surface unit aperture, a surface heating unit located within said drip pan, said drip pan adjacent said rim being provided with two apertures, said surface heating unit being provided with three supporting arms, two of said arms having projections extending through said apertures into supporting relationship with said flange, said flange being provided with an extension for directly supporting the third arm.

4. A surface heating arrangement for a flanged surface unit aperture in the range top of a range including a removable drip pan having a rim large enough in diameter to rest upon the range top outside of the flange of said surface unit aperture, a surface heating unit located within said drip pan, said drip pan adjacent said rim being provided with two apertures, said surface heating unit being provided with three supporting arms, two of said arms having projections extending through said apertures into supporting relationship with said flange, said flange being provided with a bracket for directly supporting the third arm.

5. A surface heating arrangement for a step type flange aperture in the range top of a range including a removable drip pan having a rim large enough in diameter to rest upon the range top outside said step type flange, a surface heating unit located within said drip pan, said surface heating unit having a plurality of supporting arms, said pan having a plurality of apertures directly above said step type flange, said arms having portions extending through said apertures into direct contact supporting relationship with said step type flange.

6. A surface heating arrangement for the surface unit aperture in the range top of a range including a surface heating unit located in said aperture, a drip pan located beneath said unit, said drip pan having an aperture therein, a bracket supported by said range top having a projection extending through said aperture into said drip pan, said surface heating means being provided with support means resting upon said projection.

7. A surface heating arrangement for the surface unit aperture in the range top of a range including a surface heating unit located in said aperture, a drip pan located beneath said unit, said drip pan having an aperture therein, a bracket supported by said range top having a projection extending through said aperture into said drip pan, said surface heating means being provided with support means resting upon said projection, and an interlocking arrangement between the support means and the projection for limiting lateral movement.

8. A surface heating arrangement for the surface unit aperture in the range top of a range including a surface heating unit located in said aperture, a drip pan located beneath said unit, said drip pan having an aperture therein, a bracket supported by said range top having a projection extending through said aperture into said drip pan, said surface heating means being provided with support means resting upon said projection, and a hinge connection mounted on said bracket connecting with said surface heating unit.

9. A surface heating arrangement for the surface unit aperture in the range top of a range including a surface heating unit located in said aperture, a bracket supported by said range top having a downwardly extending portion, said surface heating unit having a bearing portion extending alongside said downwardly extending portion, said downwardly extending portion having a plurality of apertures therein, a U member extending over said bearing portion having one leg provided with a hooking arrangement cooperating with said downwardly extending portion and one of the apertures therein, and spring means connecting the other leg of the U member to said downwardly extending portion.

10. A surface heating arrangement for the surface unit aperture in the range top of a range including a surface heating unit located in said aperture, a bracket supported by said range top having a downwardly extending portion, said surface heating unit having a bearing portion extending alongside said downwardly extending portion, said downwardly extending portion having a plurality of apertures therein, a U-member extending over said bearing portion having one leg provided with a hooking arrangement cooperating with said downwardly extending portion and one of the apertures therein, the other leg of said U member extending through another of said apertures, and a spring member extending between said other leg and said downwardly extending portion.

11. A surface heating arrangement for the surface unit aperture in the range top of a range including a surface heating unit located in said aperture, a drip pan located beneath said unit, said drip pan having an aperture therein, said surface heating unit having a terminal portion extending through said aperture, a bracket supported by said range top having a projection extending through said aperture into said drip pan, said surface heating means being provided with supporting means resting directly upon said projection.

References Cited in the file of this patent

UNITED STATES PATENTS

| 2,418,520 | Morton | Apr. 8, 1947 |
| 2,467,348 | Tuttle | Apr. 12, 1949 |
| 2,506,554 | Tuttle | May 2, 1950 |
| 2,508,552 | Tuttle | May 23, 1950 |
| 2,610,281 | Rutenber et al. | Sept. 9, 1952 |
| 2,632,837 | Andersen | Mar. 24, 1953 |